United States Patent
Faber et al.

(10) Patent No.: US 9,338,866 B1
(45) Date of Patent: May 10, 2016

(54) PANELBOARD POWER BUS WITH ARC TRANSFER FOR PASSIVE ARC CONTROL

(71) Applicant: SCHNEIDER ELECTRIC USA, INC., Palatine, IL (US)

(72) Inventors: Timothy Faber, Marion, IA (US); Cameron Woodson, Cedar Rapids, IA (US)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 0 days.

(21) Appl. No.: 14/585,703

(22) Filed: Dec. 30, 2014

(51) Int. Cl.
*H02B 1/04* (2006.01)
*H05F 3/04* (2006.01)
*H02B 1/20* (2006.01)
*H02B 1/015* (2006.01)

(52) U.S. Cl.
CPC .................. *H05F 3/04* (2013.01); *H02B 1/015* (2013.01); *H02B 1/20* (2013.01)

(58) Field of Classification Search
CPC ........... H02B 1/04; H02B 13/025; H02B 1/56
See application file for complete search history.

(56) References Cited

U.S. PATENT DOCUMENTS

| | | | | |
|---|---|---|---|---|
| 5,304,761 A | * | 4/1994 | Rosen | H01H 9/0264 200/304 |
| 6,924,721 B2 | * | 8/2005 | Afshari | H02B 1/06 218/157 |
| 7,306,470 B1 | * | 12/2007 | Johnson | H01R 13/447 439/136 |
| 7,329,813 B2 | * | 2/2008 | Josten | H02B 1/14 174/68.2 |
| 9,093,825 B2 | * | 7/2015 | Duda | H02B 1/04 |
| 2006/0082264 A1 | * | 4/2006 | Packard, III | H02B 1/21 312/223.1 |
| 2009/0086414 A1 | * | 4/2009 | Yee | H02B 1/36 361/614 |
| 2014/0160640 A1 | * | 6/2014 | Duda | H02B 1/04 361/652 |
| 2014/0362498 A1 | * | 12/2014 | Morris | F02D 11/02 361/624 |

* cited by examiner

*Primary Examiner* — Gregory Thompson
(74) *Attorney, Agent, or Firm* — Locke Lord LLP (57) ABSTRACT

Methods and systems for limiting damage caused by arcs in bus stacks provide an arc transfer feature on each side of the bus stack. The arc transfer feature captures any arcs forming near busbar connection points and transfers the arc away from the busbar connection points to the interior of the bus stack. Phase barriers along the length of the interior of the bus stack then direct the arcs toward the end of the bus stack. At the end of the bus stack, a bus end interrupter receives and extinguishes the arcs.

15 Claims, 9 Drawing Sheets

PANELBOARD POWER BUS WITH ARC TRANSFER FOR PASSIVE ARC CONTROL

CROSS-REFERENCE TO RELATED APPLICATIONS

The present application is related in subject matter to commonly-assigned U.S. application Ser. No. 13/452,145, entitled "Passive Arc Management System with a Flue Chamber," filed 20 Apr. 2012; International Application No. PCT/US13/50797, entitled "Internal Arc Management and Ventilation for Electrical Equipment," filed 17 Jul. 2013; U.S. application Ser. No. 14/501,946, entitled "Passive Arc Protection for Main Breaker Line Side Power Conductors," filed 30 Sep. 2014; U.S. application Ser. No. 14/585,477, entitled "Bus End Arc Interrupter," filed concurrently herewith; and U.S. application Ser. No. 14/585,518, entitled "Method for Treating Internal Arcs," filed concurrently herewith, all of which are incorporated herein by reference in their entirety.

FIELD OF THE INVENTION

The present invention relates generally to methods and systems for controlling and limiting the damage caused by arcing in electrical distribution equipment and, more particularly, to a method and system for reducing the severity of internal arcing events, including the incident energy exposure for proximate personnel and equipment damage and downtime.

BACKGROUND OF THE INVENTION

Arcing or arc fault is an electrical discharge through a normally nonconductive gas, usually air. Such arcing can occur internally in low-voltage electrical distribution equipment between exposed conductors of different electrical potentials, such as adjacent busbars or a busbar and ground. When an arc jumps from one conductor to another across an air gap, it can stretch and wrap itself around obstacles to follow the path of least resistance across the air gap.

Internal arcing often occurs close to a connection point, for example, where a circuit breaker plug-on power connector connects to a busbar, as a result of a shorting element, surface contamination, and the like. Plug-on power connectors are typically proximate to personnel and therefore removal of the arc away from the plug-on power connectors would help reduce the hazard to personnel and equipment. These hazards arise from the arc flash and arc blast associated internal arcing and can cause significant damage. Arc blasts, for example, can release large amounts of energy that produce intense pressures, extremely hot gasses, vaporized metals/polymers, and other harmful byproducts.

Techniques for controlling arcing are known in the art, including passive and active arc control techniques. Active arc control techniques usually include some form of sensing and a switching mechanism to control the arc current. Concerns with active techniques may include higher cost, nuisance breaker trips, speed, and undetected system failures. Passive techniques may include containment and directed venting of the arc energy and gasses. Other passive arc control techniques may include structural reinforcements to better withstand the byproducts from the arc. Neither of the above passive methods limits the arcing event.

In addition, some passive internal arc management devices, such arc resistant switchgear and the like, use ventilation conduits and/or tubes to vent the arc byproducts. However, the hot gasses, vaporized metals/polymers, and other byproducts remain sufficiently hot even after leaving the tubes or conduits to damage other components over time. Additional costs in components and assembly labor must be expended to address these concerns.

Thus, a need exists for an improved way to control and limit the damage caused by arcs in electrical distribution equipment.

SUMMARY OF THE DISCLOSED EMBODIMENTS

The embodiments disclosed herein are directed to methods and systems for controlling and limiting the damage caused by arcs in electrical distribution equipment like panelboards, including the I-Line™ series of panelboards from Schneider Electric USA, Inc. The methods and systems provide a panelboard having an arc transfer feature that can transfer or otherwise move arcs forming in the panelboard away from the busbar connection points therein so the arcs do not damage equipment or harm personnel. It has been found in some cases that transferring the arc may be done more safely, quickly, and consistently than, for example, interrupting the arc at its original location. Having a panelboard that provides the ability to more consistently transfer arcs is particularly important given the wide variety of circuit breaker types that may be mounted side by side in the panelboard. In addition, because the original location of the arc is generally more proximate to personnel, transferring the arc also reduces the exposure of such personnel to the arc and arc byproducts.

Panelboards like the I-Line™ and similar panelboards have a bus stack composed of parallel and spaced apart busbars. Circuit breakers may be connected to these panelboard via plug-on power connectors or similar connectors having conductive jaws that grip the side edges of the busbars. These jaws are partly concealed or otherwise guarded by an insulating shroud on each circuit breaker. Specifically, each shroud has shroud members resembling slats extending laterally inward toward the busbars substantially parallel to the busbars. Adjacent shroud members define a slot therebetween in which one or more jaws may be recessed. In a 3-pole circuit breaker, for example, up to three pairs of adjacent shroud members (i.e., six shroud members) may define three parallel slots, respectively, one slot on top of the other. When a circuit breaker is connected to the busbars, the jaws of the plug-on connectors grip the busbars while the shroud members project over and under the busbars.

Any unused circuit breaker mounting space on the panelboard is typically filled with blank fillers to maintain the integrity of the panelboard. The blank fillers act both as a shock barrier preventing physically touching the busbars and as an arc flash barrier preventing exposure to arcs. The blank fillers may be provided with similar insulating shrouds and shroud members as the circuit breakers, but without jaws recessed therein. Likewise, the area in between neighboring pairs of shroud members on both the blank fillers and the circuit breakers are unoccupied by jaws.

In some implementations, the insulating shrouds of the circuit breakers and blank fillers may be equipped with overlap seals similar to the flue channels described in U.S. application Ser. No. 13/452,145 referenced above. The overlap seals may for example have a tongue-and-groove type interleaved structure provided by structures on adjacent overlap seal members that will help to cover any leak paths between the circuit breakers and blank fillers and the panelboard through which arc byproducts may escape and also provide a circuitous and narrow-channeled route for cooling of escaping hot gases. When installed on a shroud, the overlap seals are designed to fit precisely with each other and with a top cover of the shrouds to provide a seal for any gaps that may exist between adjacent circuit breakers, adjacent blank fillers, adjacent circuit breakers and blank fillers, and between the circuit breakers and blank fillers and the panelboard. These overlap seals help cool any arc byproducts that may escape from the panelboard, ensuring that any escaping arc byproducts pose less or no risk to personnel and equipment.

The circuit breakers and blank fillers along with top and bottom flange plates running lengthwise over the top and under the bus stack form a housing substantially enclosing the bus stack. Within the bus stack housing, an insulated phase barrier resembling a nonconductive busbar extends lengthwise between adjacent busbars substantially parallel thereto and equidistant therefrom. Each phase barrier spans less than (e.g., about half) the width of the busbars, which leaves an uncovered area running along each side of the phase barrier where the phase barrier does not extend between adjacent busbars. An insulating channel member substantially in the shape of a "C" is fitted or otherwise provided between adjacent busbars in the uncovered area such that there are corridors bracketing each phase barrier on the sides thereof. Each channel member runs lengthwise between adjacent busbars to create a substantially C-shaped corridor along each side of the phase barrier. These channel members effectively wall off the phase barrier from the circuit breakers on the other side of the channel members.

An arc barrier resembling a ledge projects outward from near the middle of each insulating channel member parallel to the busbars toward the circuit breakers. The arc barriers extend into the unoccupied areas in between neighboring pairs of shroud members on the circuit breaker. This gives the overall appearance of the shroud members being interleaved with the busbars and the arc barriers in the panelboard. Each arc barrier is substantially coterminous with the busbars so the shroud members extend over and under the arc barrier without physically contacting the arc barrier. The lack of physical contact leaves a winding passage between adjacent busbars formed by the shroud members on one side; and the busbars, C-shaped corridors, and arc barriers on the other side; where arcs may form.

In general operation, the winding arc passage provides a region or zone in which arcs may initiate and the C-shaped corridor provides an adjoining region or zone where arcs may be transited. Any arcs forming in the arc initiation zone must start on one of the busbars, typically near a circuit breaker connection point, then wind through the winding arc passage, before reaching an adjacent busbar. Within the winding arc passage, intense pressure quickly builds due to the gas and plasma produced by the arc, also called "arc blast." The intense pressure push the arc gas and plasma outward from the winding arc passage toward the C-shaped corridors inside the insulating channel members of the bus stack and around the phase barriers. Openings in the insulating channel members allow the gas and plasma to pass into the C-shaped corridor on the other side. One-way valves such as flapper valves over the openings trap and prevent the gas and plasma from returning to the winding arc passage. The trapped gas and plasma spawn a second arc that is electrically parallel to, but lower in impedance and voltage than, the initial arc owing to the second arc not having to stretch all the way around the arc barrier. The lower voltage of the second arc becomes the "effective" system voltage, which means the voltage of the initial arc is now higher than the system voltage. Because the voltage of the initial arc now exceeds the system voltage, the current from the initial arc is driven to zero and the initial arc is extinguished. The second arc is then propelled by electromagnetic forces along the C-shaped corridor toward the end of the busbars, guided by the phase barrier running along the corridor. The transit of the second arc through this region or transit zone continues until the arc reaches the end of the busbars. The arc thereafter goes into a box-like arc-extinguishing structure called a bus end arc interrupter where the arc is disrupted and dispersed, as described in U.S. application Ser. No. 14/585,518, entitled "Bus End Arc Interrupter" referenced above.

In some implementations, the "C" shapes of the channel members overlap a portion of the phase barrier such that no line-of-sight path exists between adjacent busbars within the C-shaped corridor. The lack of a line-of-sight path causes any arcs that may form between adjacent busbars in the C-shaped corridor to assume an arcuate or serpentine shape in the corridors, thus stretching and increasing the voltage of the arc. The increased voltage reduces the arc current, resulting in lower total energy generated by the arc.

In some implementations, the bus stack may be a 3-phase/3-conductor system, while in other implementations, the bus stack may be a single-phase/2-conductor system, single-phase/3-conductor system, 3-phase/4-conductor system, and the like.

In general, in one aspect, the disclosed embodiments are directed to an arc resistant panelboard having arc transfer feature. The arc resistant panelboard comprises, among other things, a bus stack on the panelboard, the bus stack having a plurality of parallel and spaced apart busbars therein, and a phase barrier disposed lengthwise between adjacent busbars substantially parallel to and equidistance from the busbars. The arc resistant panelboard also comprises a channel member fitted lengthwise between the adjacent busbars and bracketing a side of the phase barrier such that the channel member forms a shaped corridor with the phase barrier extending lengthwise between the adjacent busbars. The arc resistant panelboard further comprises an arc barrier projecting from a back side of the channel member substantially perpendicularly thereto such that when a circuit breaker is connected to the bus stack, the arc barrier, the busbars and the channel member form a winding arc passage with the circuit breaker in which any arc forming between the adjacent busbars is captured. Any arc captured in the winding arc passage between the adjacent busbars is transferred by arc blast pressure in the winding arc passage into the shaped corridor through openings in the channel member.

In general, in another aspect, the disclosed embodiments are directed to a method of transferring an arc away from circuit breaker connection points on adjacent busbars in a bus stack of a panelboard. The method comprises, among other things, capturing the arc in a winding arc passage between the adjacent busbars on a side of the bus stack, transferring the arc from the winding arc passage into a shaped corridor within the bus stack, and directing the arc in the shaped corridor toward an end of the bus stack where the arc may be extinguished.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
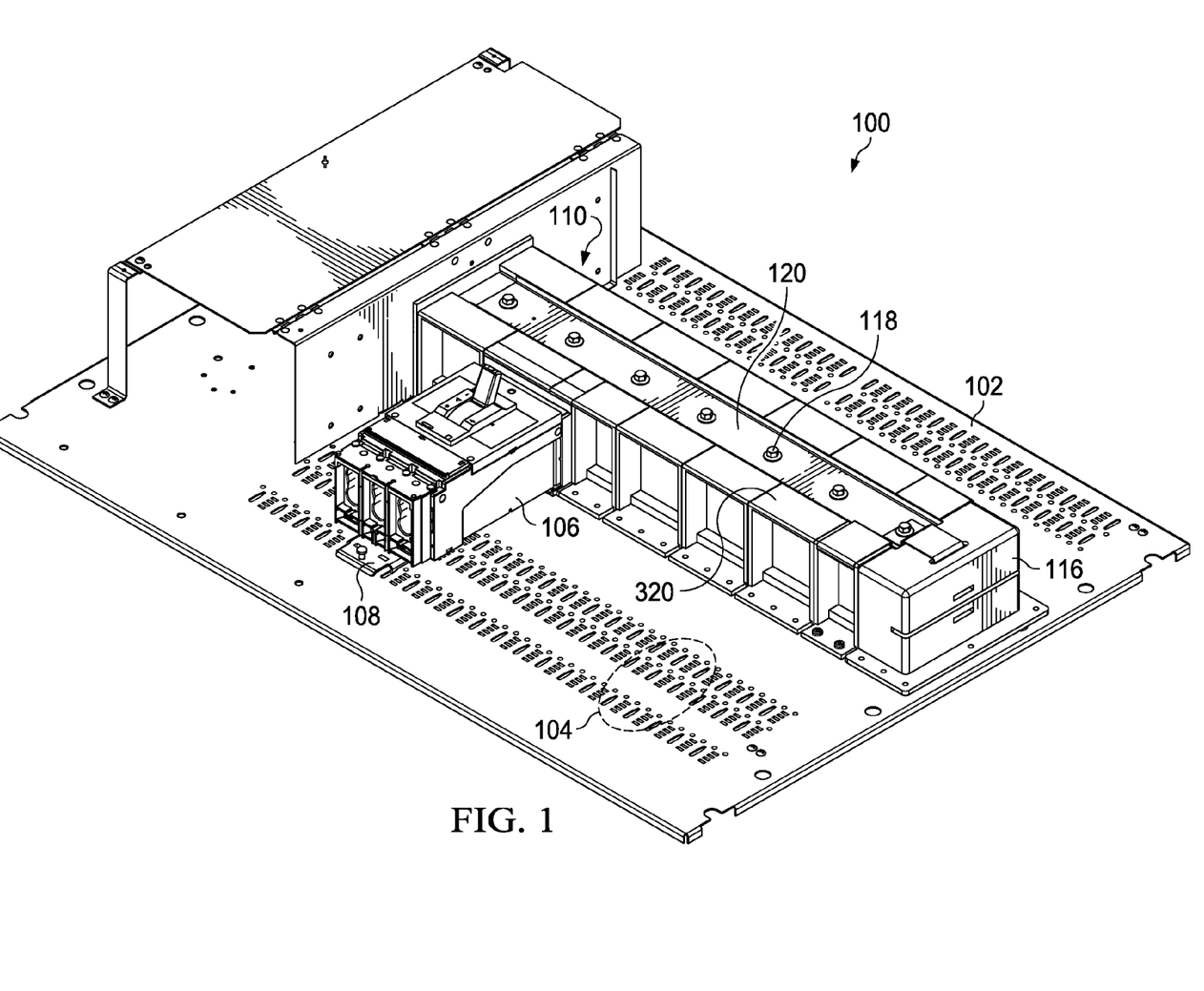
FIG. 1 shows exemplary panelboard having an arc transfer feature according to one or more embodiments disclosed herein.

Referring now to FIG. 1, an exemplary panelboard 100 is shown having an arc transfer feature for controlling and limiting the damage caused by arcs in accordance with the disclosed embodiments. Specifically, the panelboard 100 is designed to move or otherwise transfer arcs that form in the panelboard 100 away from busbar connection points therein. As mentioned earlier, it has been found in some cases that transferring the arc may be done more safely, quickly, and consistently than, for example, interrupting the arc at its original location. The ability of the panelboard 100 to more consistently transfer arcs is particularly important given the wide variety of circuit breaker types that may be mounted side by side in the panelboard 100. In addition, because the original location of the arc is generally closer to personnel, transferring the arc also reduces the exposure of such personnel to the arc and arc byproducts. In some embodiments, the panelboard 100 may resemble the I-Line™ series of panelboards from Schneider Electric USA, Inc. or similar panelboards. These panelboards 100 have a bus stack (seen in FIG. 2) composed of parallel and spaced apart busbars.

In the example of FIG. 1, the panelboard 100 has a mounting pan 102 having a series of mounting holes 104 formed therein. The mounting holes 104 allow one or more circuit breakers 106 to be mounted on the mounting pan 102 via mounting brackets 108 attached to the circuit breakers 106. The circuit breakers 106 form part of a housing 110 that encloses the bus stack therein, with blank fillers 320 filling in any unused circuit breaker mounting space on the panelboard 100 to maintain the integrity of the housing 110. A box-like arc-extinguishing structure called a bus end arc interrupter 116 closes off the housing 110. Bolts or other fasteners, one of which is indicated at 118, extend through the entire assembly, including top and bottom flange plates 120a and 120b (see FIG. 5) running lengthwise along the top of the housing 110 to secure the assembly together. In some embodiments, overlap seals having parallel and interleaved projections provided by structures on interfacing surfaces of the adjoining circuit breakers or blank fillers, or both, that resemble a tongue-and-groove structure may be provided to cover any leak paths between the circuit breakers 106, blank fillers 320, and panelboard 100 through which arc byproducts may escape. The overlap seals provide a circuitous and narrow-channeled route for cooling any escaping hot gases.

Figure 2:
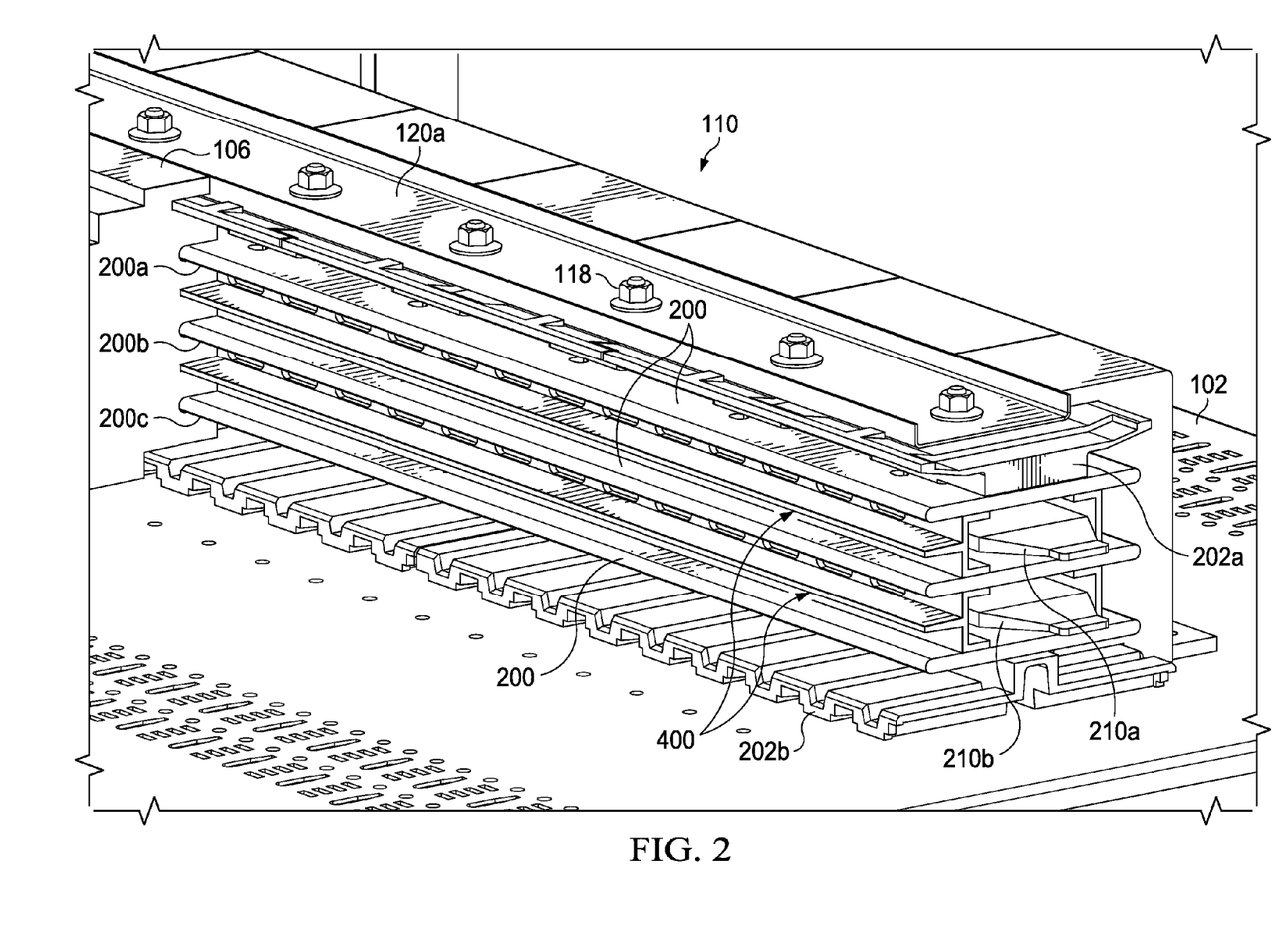
FIG. 2 shows an internal view of exemplary panelboard having an arc transfer feature according to one or more embodiments disclosed herein.

FIG. 2 shows an internal view of the panelboard 100 according to the disclosed embodiments. From this view, a bus stack 200 may be seen composed of three parallel and spaced apart busbars 200a-c. The bus stack 200 shown here is for a 3-phase/3-conductor system, but the principles and teachings disclosed herein are equally applicable to other types of systems, including a single-phase/2-conductor system, single-phase/3-conductor system, 3-phase/4-conductor system, and the like. The bus stack 200 sits between an upper insulator 202a and a lower insulator 202b that insulate the bus stack 200 from the top flange plate and mounting plate, respectively. The circuit breakers 106 may then be connected to these busbars 200a-c as described later herein.

Insulated phase barriers 210a and 210b resembling a nonconductive busbar extend lengthwise between adjacent busbars 200a-c substantially parallel to the busbars 200a-c. Each phase barrier 210a-b spans less than (e.g., about half) the width of the busbars 200a-c, which leaves an uncovered area along each side of the phase barrier 210a-b where the phase barrier does not extend between adjacent busbars 200a-c. An insulating channel member 400 substantially in the shape of a "C" is fitted or otherwise provided between adjacent busbars 200a-c in the uncovered area such that there are channel members 400 bracketing each phase barrier 210a-b on the sides thereof. These channel members 400 effectively wall off the phase barrier 210a-b from the circuit breakers 106 on the other side of the channel members 400.

Figure 3A:
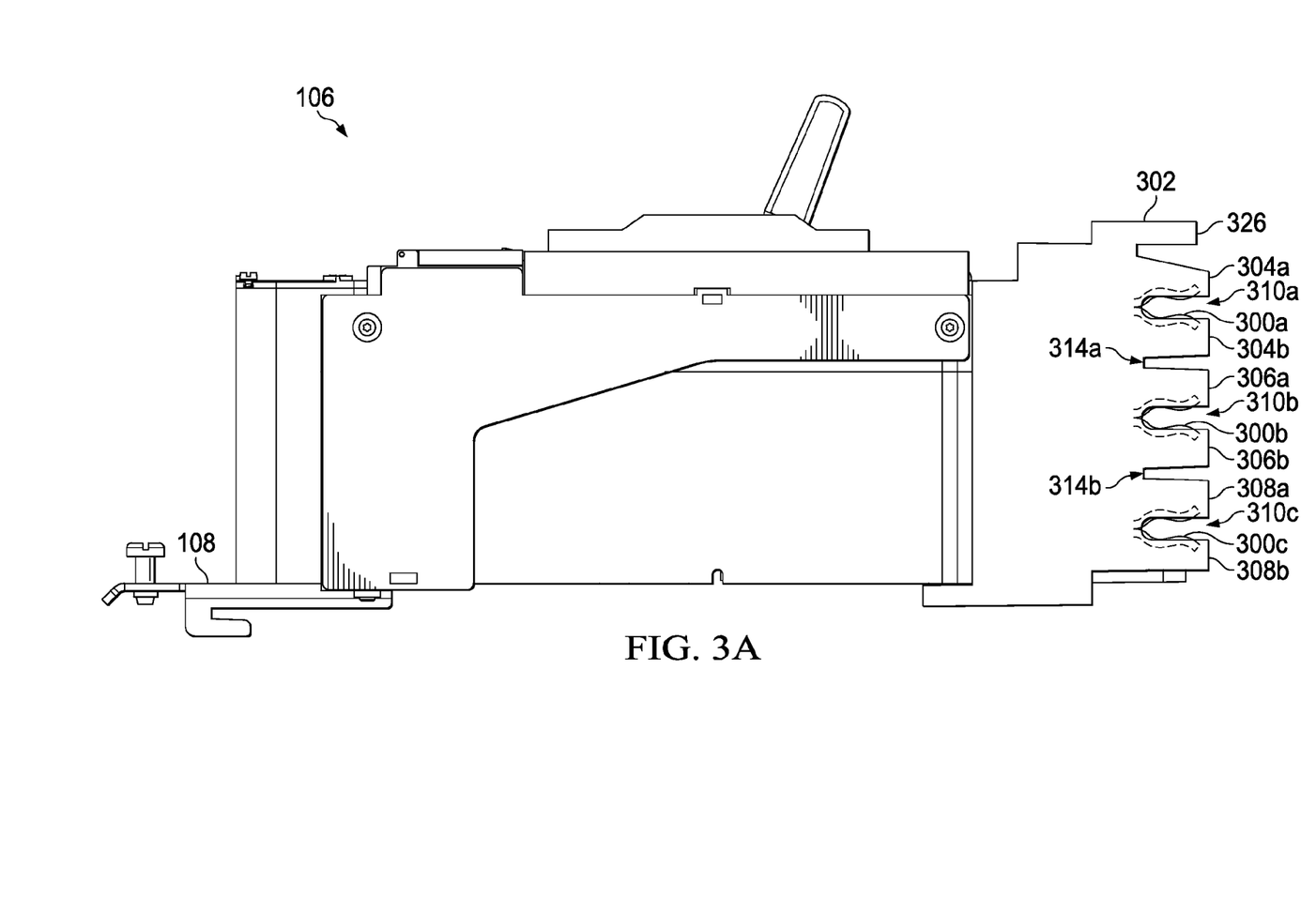
FIGS. 3A-3B show an exemplary circuit breaker and blank filler used with the arc transfer feature according to one or more embodiments disclosed herein.

An example of the circuit breaker 106 is shown in FIG. 3A. This type of circuit breaker 106 uses plug-on power connectors or similar connectors that have conductive jaws 300a, 300b, and 300c for gripping the side edges of the busbars 200a-c. These jaws 300a-c are partly concealed by an insulating shroud 302 on each circuit breaker. Specifically, each shroud 302 has a series of shroud members resembling slats extending substantially parallel to one another. Pairs of adjacent shroud members define a slot in which one or more jaws may be recessed. In the example shown here, three pairs of adjacent shroud members 304a & 304b, 306a & 306b, and 308a & 308b define three parallel slots 310a, 310b, and 310c in which the jaws 300a-c are recessed, respectively. When the circuit breaker 106 is connected to the panelboard 100, the jaws 300a-c grip the busbars 200a-c while the shroud members 304a-b, 306a-b, and 308a-b project over and under the busbars 200a-c.

Figure 3B:
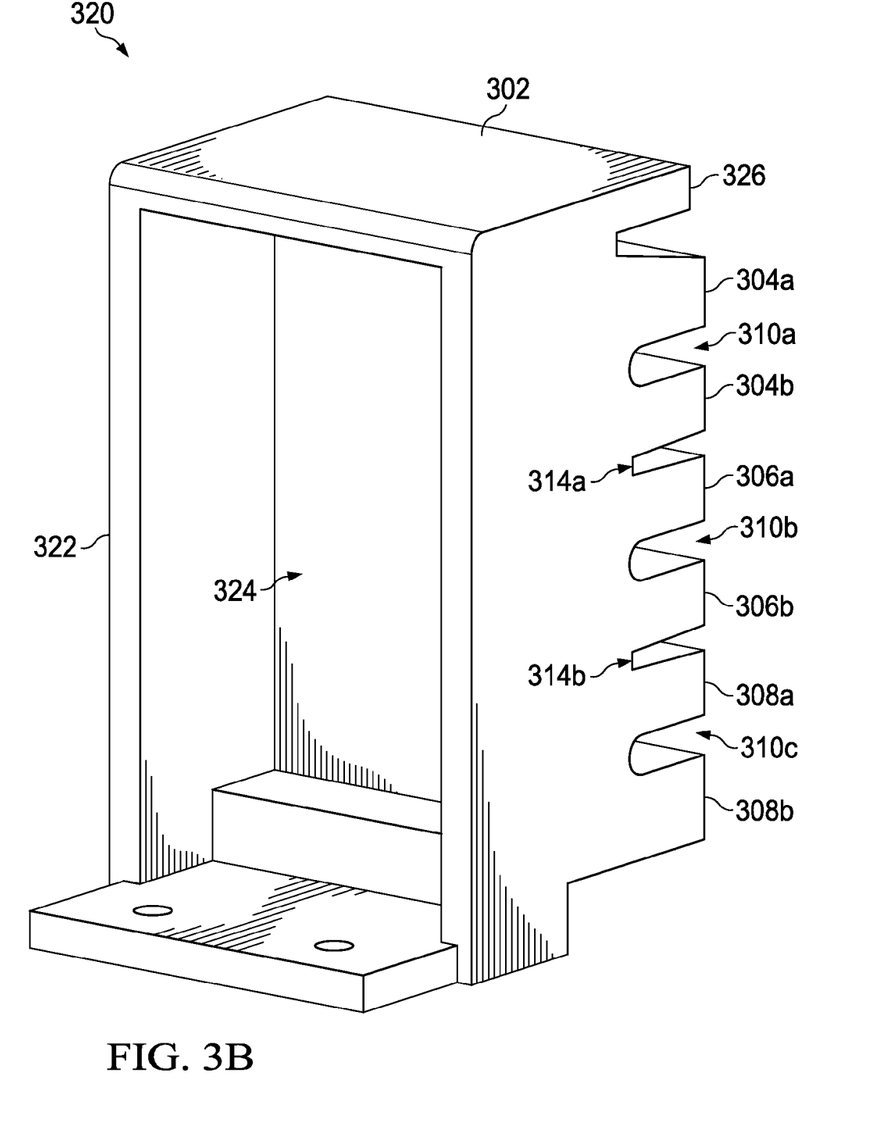

Any unused circuit breaker mounting space on the panelboard 100 is filled with the above-mentioned blank fillers 320, a more detailed example of which is shown in FIG. 3B, to maintain the integrity of the panelboard 100. As can be seen in FIG. 3B, in some embodiments, the blank filler 320 may have a frame like body 322 having an alcove 324 defined therein, although other blank filler designs are certainly possible. On the opposite side from the alcove 324, the blank filler 320 may be provided with a similar insulating shroud 302 and shroud members 304a-b, 306a-b, and 308a-b as the circuit breaker, except there are no jaws recessed in the blank fillers 320. Likewise, the area in between neighboring pairs of shroud members on both the blank fillers 320 and the circuit breakers 106 are unoccupied by jaws. In the example shown, shroud members 304b and 306a have an area 314a therebetween that is unoccupied by jaws, and shroud members 306b and 308a have an area 314b therebetween that is unoccupied by jaws. A top cover 326 near the top of the blank filler 320 extends over the shroud members 304a-b, 306a-b, and 308a-b substantially parallel therewith that may be engaged with the top flange plate 120a (see FIG. 2) of the bus stack 200 housing 110.

In some embodiments, the insulating shrouds 302 of the circuit breakers 106 and blank fillers 320 may be fitted with the overlap seals mentioned above to cover any leak paths between the circuit breakers 106 and blank fillers 320 and the panelboard 100 through which arc byproducts may escape. The overlap seals extend along the edges of the shrouds 302 and have dimensions that may vary depending on the widths of the circuit breakers (e.g., 3 inches, 4.5 inches, 6 inches, 7.5 inches, 9 inches, 15 inches, etc.) and the widths of any blank fillers (e.g., 3 inches, 4.5 inches, etc.) used with the panelboard 100. When properly installed, the overlap seals fit precisely with each other and with the top cover 326 of the shrouds 302 to provide a seal for any gaps that may exist between adjacent circuit breakers 106, adjacent blank fillers 320, adjacent circuit breakers and blank fillers, and between the circuit breakers and blank fillers and the panelboard 100. These overlap seals help cool any arc byproducts that may escape from the panelboard 100, making sure such escaping arc byproducts pose less or no risk to personnel and equipment.

Figure 4A:
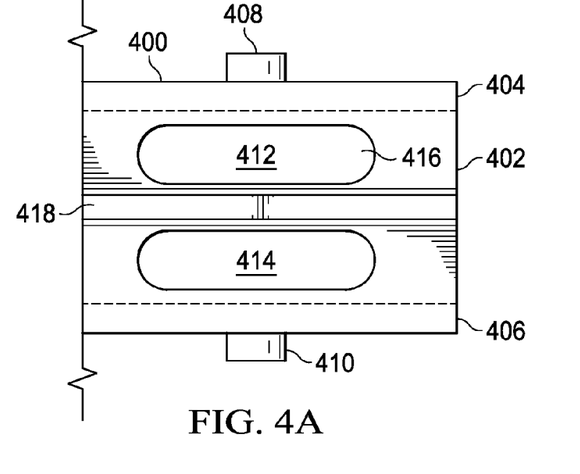
FIGS. 4A-4C show an exemplary channel member used with the arc transfer feature according to one or more embodiments disclosed herein.
Figure 4B:
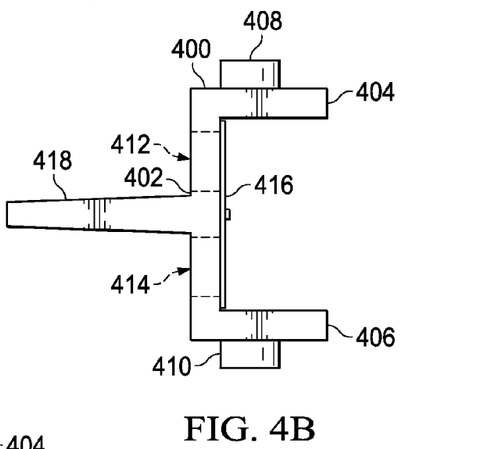
Figure 4C:
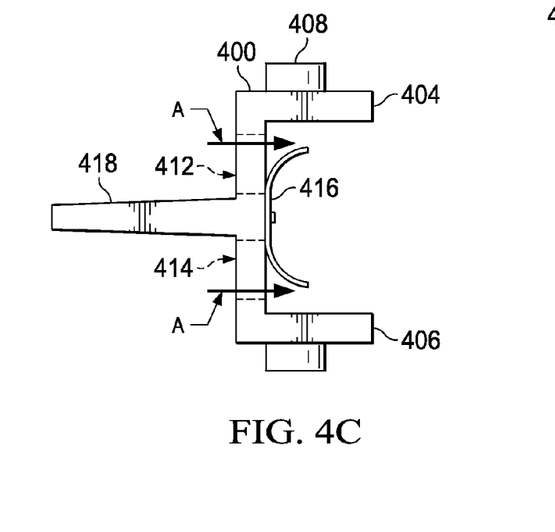

As mentioned above, a C-shaped channel member 400 may be fitted between adjacent busbars 200a-c on either side of the phase barriers 210a-b in the disclosed panelboard 100. FIG. 4A shows the back of the channel member 400 and FIGS. 4B and 4C show the side of the channel member 400. As can be seen, the C-shaped channel member 400 is composed of a vertical section 402 having horizontal sections 404 and 406 extending substantially perpendicularly from the upper and lower ends of the vertical section 402. A series of evenly spaced mounting posts, two of which are shown here at 408 and 410, protrude along the top and bottom of the horizontal sections 404 and 406, respectively. These mounting posts 408 and 410 extend into corresponding openings (not expressly shown until FIG. 5) in the busbars 200a-c to retain the channel member 400 in place between adjacent busbars 200a-c.

Similarly, regularly spaced openings, two of which are shown here at 412 and 414, are provided along the vertical section 402. The openings 412 and 414 are arranged in two rows, one row each in the upper and lower half of the vertical section 402, each set of upper and lower openings 412 and 414 preferably having a circuit breaker 106 aligned opposite the openings. Likewise, regularly spaced one-way valves, one of which is shown here at 416, are attached to the vertical section 402 over each set of upper and lower openings 412 and 414. In some embodiments, the one-way valves 416 may be flapper valves that permit flow of the arc blast through the channel member 400 only in one direction toward the front or open side of the "C" shape, as indicated by the arrows labeled "A" in FIG. 4C. An arc barrier 418 resembling a ledge projects outward from the back side of the channel member 400 near the middle of the vertical section 402 substantially perpendicularly thereto.

Figure 5:
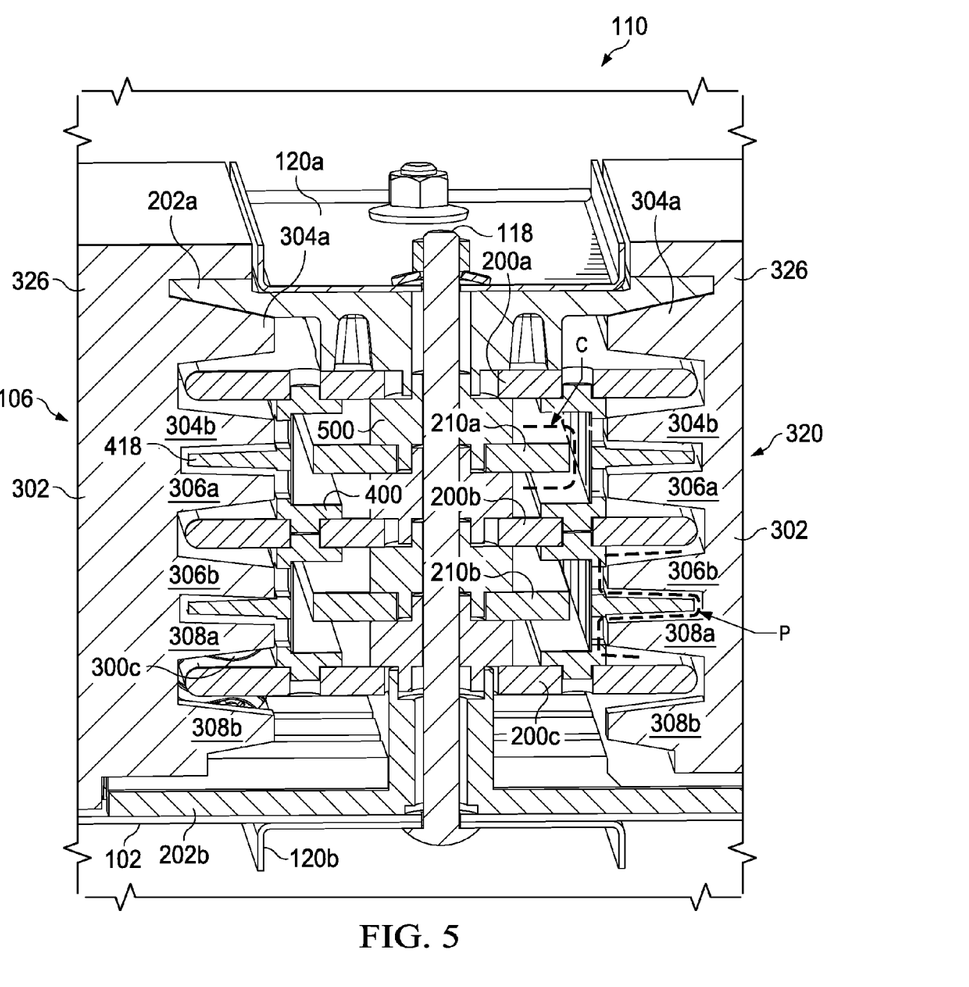
FIG. 5 shows a cross-sectional view of exemplary bus stack having an arc transfer feature according to one or more embodiments disclosed herein.

The arc barriers 418 can be seen in FIG. 5, which shows a cross-sectional view of the bus stack housing 110. From this view, the channel members 400 can be seen running lengthwise between adjacent busbars 200a-c to create a substantially C-shaped corridor, indicated by the dashed line labeled "C," along each side of the phase barrier 210a-b. Insulating annular busbar supports 500 are disposed between each busbar 200a-c and phase barrier 210a-b. Such busbar supports 500 may be placed at regular intervals along the length of the busbars 200a-c to keep the busbars and the phase barriers 210a-b spaced apart and electrically isolated from one another. The fasteners 118 extend through these busbar supports 500 as well as the top and bottom flange plates 120a-b, the upper and lower insulators 202a-b, and the mounting plate 102 to keep the entire assembly together.

As FIG. 5 shows, the arc barriers 418 extend parallel to the busbars 200a-c toward the shroud members 304a-b, 306a-b, and 308a-b of the circuit breaker 106 and are substantially coterminous with the busbars 200a-c. Specifically, each arc barrier 418 extends into the unoccupied area in between neighboring pairs of shroud members 304a-b & 306a-b and 306a-b & 308a-b such that the shroud members 304a-b, 306a-b, and 308a-b are interleaved with the busbars 200a-c and arc barriers 418, but do not touch the busbars 200a-c or arc barriers 418. The lack of physical contact leaves a narrow passage (e.g., less than 10 mm) winding between adjacent busbars 200a-c formed by the shroud members 304a-b, 306a-b, and 308a-b on one side; and the busbars 200a-c, C-shaped channel members 400, and arc barriers 418 on the other side; where arcs may form, as indicated by the dashed line labeled "P."

Figure 6A:
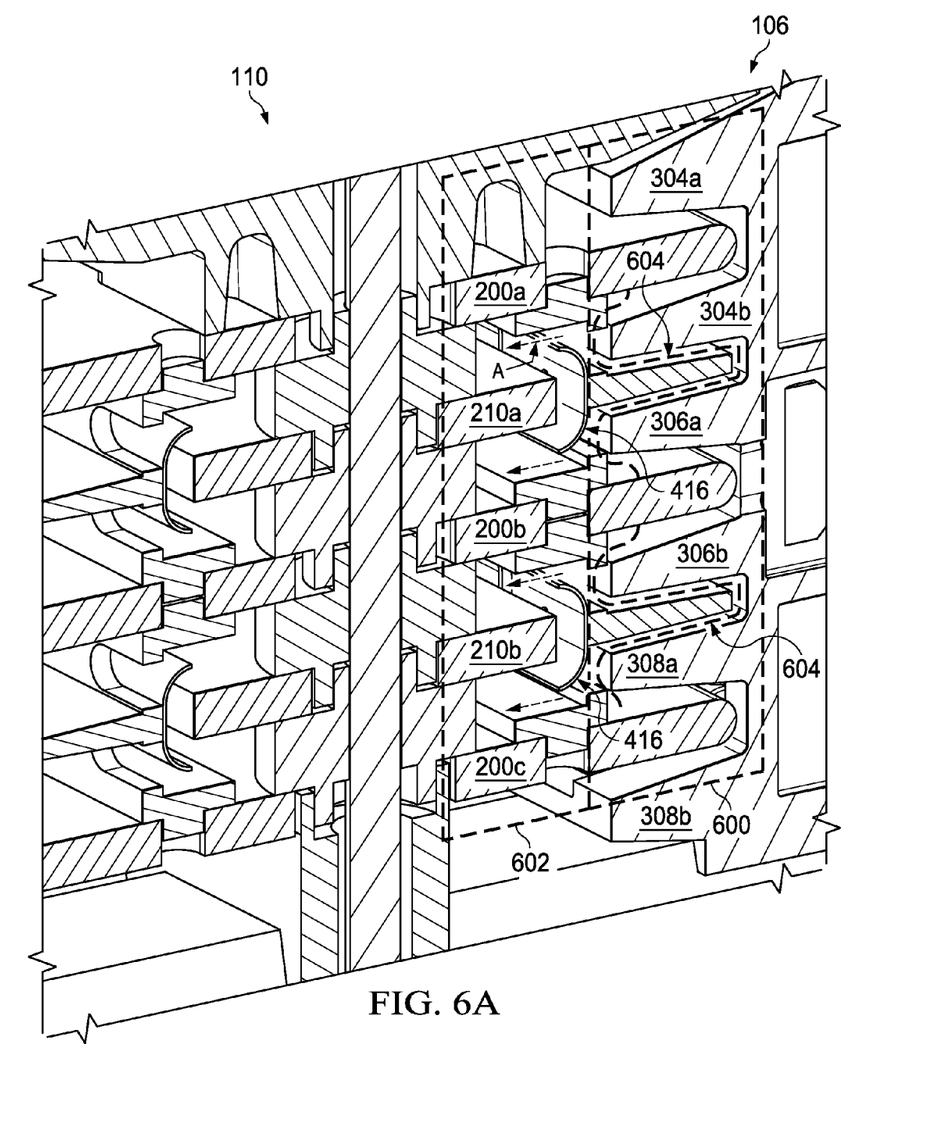
FIGS. 6A-6B show an arc being transferred by an exemplary bus stack according to one or more embodiments disclosed herein.
Figure 6B:
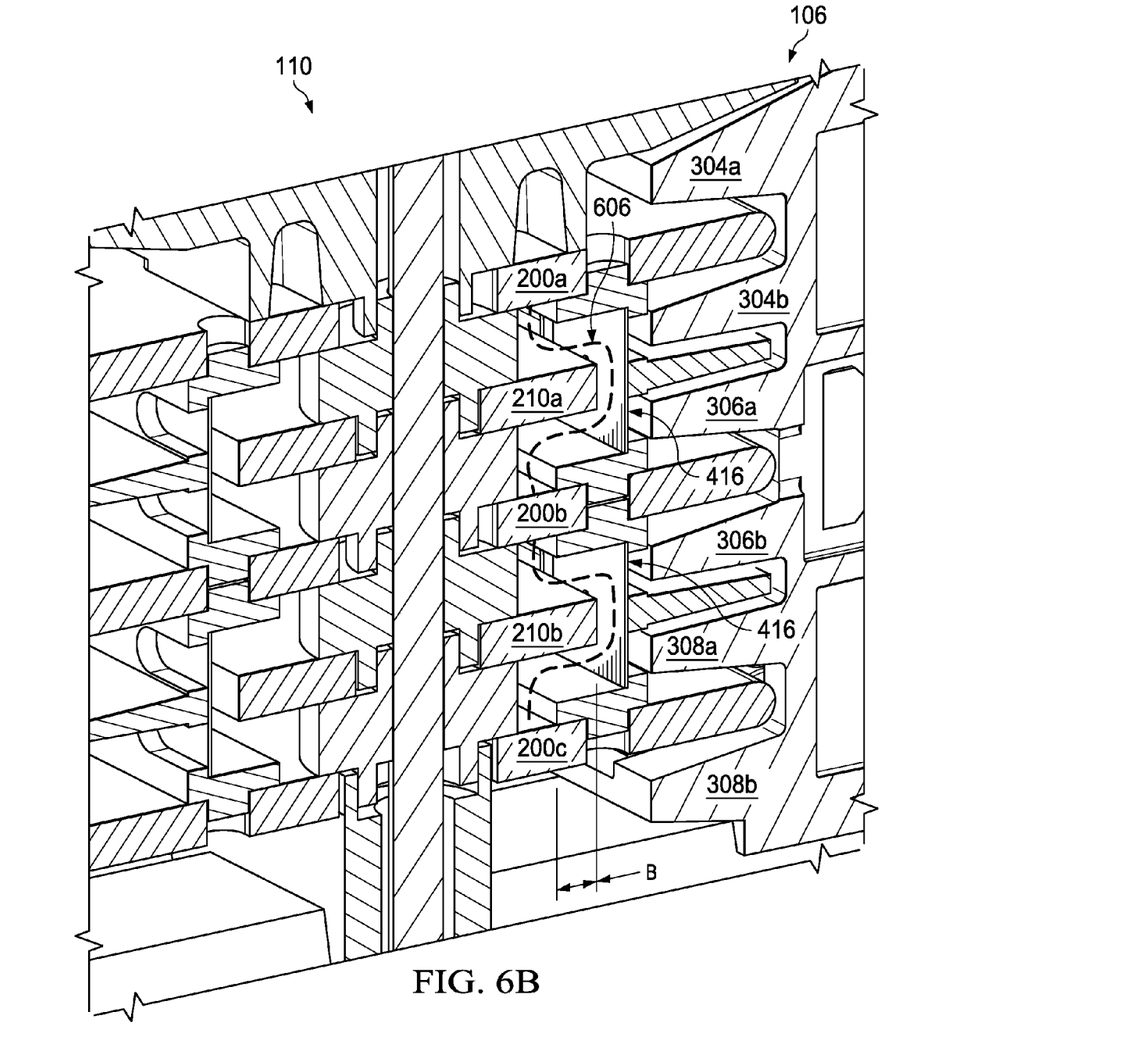

Referring now to FIGS. 6A and 6B, the winding arc passage provides a region or zone 600 in which arcs may initiate and the C-shaped corridor provides an adjoining region or zone 602 or arcs may transit. An arc 604 forming in this arc initiation zone 600 must start on one of the busbars 200a-c, typically near a circuit breaker 106 connection point, bend or wind through the winding arc passage, before reaching an adjacent busbar 200a-c. Within the winding arc passage, intense pressure is immediately generated due to the gas and plasma produced by the arc. The intense pressure of the arc blast blows the gas and plasma outward from the winding arc passage toward the C-shaped channel members 400. The openings 412 and 414 (see FIGS. 4A-4C) in the channel members 400 allow the gas and plasma to pass into the C-shaped corridor on the other side, as indicated by the arrows labeled "A" (see FIG. 6B).

One-way flapper valves 416 over the openings 412 and 414 trap and prevent the gas and plasma from returning to the winding arc passage. Therefore, the gas and plasma spawn a second arc 606 that is electrically parallel to, but lower in impedance and voltage than, the initial arc 604. The lower voltage of the second arc 606 becomes the "effective" system voltage, resulting in the voltage of the initial arc 604 being all of a sudden higher than the system voltage. Because the voltage of the initial arc 604 now exceeds the system voltage, the current from the initial arc 604 is driven to zero and the initial arc is extinguished. The second arc 606 is then propelled by electromagnetic force along the C-shaped corridor toward the end of the busbars 200a-c, guided by the phase barrier 210a-b running along the corridor. The transit of the second arc 606 through this transit zone 602 continues until the arc reaches the end of the busbars 200a-c. The arc thereafter enters the bus end arc interrupter 116 (see FIG. 1) where it is disrupted and dispersed.

In some embodiments, to facilitate the transit of the second arc 606 into the bus end arc interrupter 116, the C-shaped corridors in the panelboard 100 may be similar to their counterpart corridors in the bus end arc interrupter 116. For example, in some embodiments, the horizontal sections 404 and 406 of the C-shaped channel members 400 overlap a portion of the phase barrier, as indicated by the arrow labeled "B," such that no line-of-sight path exists between adjacent busbars 200a-c within the C-shaped corridor. The lack of a line-of-sight path causes any arcs that may form between adjacent busbars 200a-c in the C-shaped corridor to wrap around the phase barrier, assuming an arcuate or serpentine shape in the process that stretches and increases the voltage of the arc. The increased voltage reduces the arc current, resulting in lower total energy generated by the arc.

Figure 7:
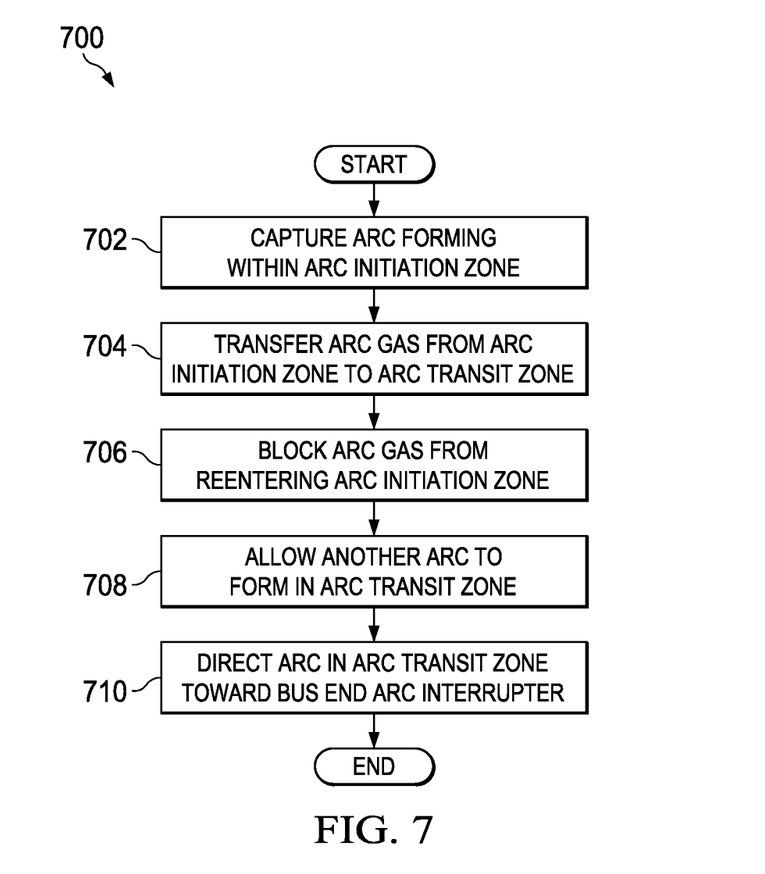
FIG. 7 shows an exemplary flowchart of a method for transferring an arc according to one or more embodiments disclosed herein.

Based on the foregoing description, it can be seen that the arc transfer method and system disclosed herein may be implemented in a number of ways. FIG. 7 offers general guidelines in the form of a flow chart 700 that may be used with any implementation according to the disclosed embodiments. As the flow chart 700 shows, arc transfer begins at block 702 by capturing the arc in an arc initiation zone. Gas and plasma produced by the arc is then transferred from the arc initiation zone to an arc transit zone at block 704. At block 706, the arc gas and plasma are prevented from reentering the arc initiation zone. A second arc is allowed to form in the arc transit zone at block 708 from the arc gas and plasma trapped the arc transit zone, extinguishing the initial arc in the process as explained above. At block 710, the second arc is directed along the arc transit zone toward a bus end arc interrupter where it is extinguished.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. An arc resistant panelboard having arc transfer feature, comprising:
a bus stack on the panelboard, the bus stack having a plurality of parallel and spaced apart busbars therein;
a phase barrier disposed lengthwise between adjacent busbars substantially parallel to and equidistance from the busbars;
a channel member fitted lengthwise between the adjacent busbars and bracketing a side of the phase barrier such that the channel member forms a shaped corridor with the phase barrier extending lengthwise between the adjacent busbars; and
an arc barrier projecting from a back side of the channel member substantially perpendicularly thereto such that when a circuit breaker is connected to the bus stack, the arc barrier, the busbars and the channel member form a winding arc passage with the circuit breaker in which any arc forming between the adjacent busbars is captured;
wherein any arc captured in the winding arc passage between the adjacent busbars is transferred by arc blast pressure in the winding arc passage into the shaped corridor through openings in the channel member.

2. The arc resistant panelboard of claim 1, wherein the phase barrier directs any arc transferred into the shaped corridor toward an end of the bus stack.

3. The arc resistant panelboard of claim 1, further comprising one-way valves disposed in the openings in the channel member, the one-way valves blocking flow of arc gas and plasma from the shaped corridor into the winding arc passage.

4. The arc resistant panelboard of claim 1, wherein the channel member overlaps a portion of the phase barrier such that there is no line-of-sight path between adjacent busbars in the shaped corridor.

5. The arc resistant panelboard of claim 1, further comprising a circuit breaker connected to the bus stack, the circuit breaker having a shroud with substantially parallel shroud members protruding therefrom, the shroud members being interleaved with the busbars and the arc barrier to form the winding passage between the adjacent busbars.

6. The arc resistant panelboard of claim 5, further comprising a blank filler having a similar shroud and shroud members as the circuit breaker, the shroud members of the blank filler being interleaved with the busbars and the arc barrier when the blank filler is attached to the bus stack to form a winding arc passage with the busbars, channel member, and arc barrier.

7. The arc resistant panelboard of claim 1, wherein the channel member is a C-shaped channel member and the corridor is a C-shaped corridor.

8. The arc resistant panelboard of claim 1, further comprising mounting posts disposed on a top and bottom of the channel member, the mounting posts extending into corresponding openings in the adjacent busbars to retain the channel member in place between the adjacent busbars.

9. The arc resistant panelboard of claim 1, wherein the bus stack is one of: a 3-phase/3-conductor system, a 3-phase/4-conductor system, a single-phase/2-conductor systems, and a single-phase/3-conductor system.

10. A method of transferring an arc away from circuit breaker connection points on adjacent busbars in a bus stack of a panelboard, comprising:
capturing the arc in a winding arc passage between the adjacent busbars on a side of the bus stack;
transferring the arc from the winding arc passage into a shaped corridor within the bus stack; and
directing the arc in the shaped corridor toward an end of the bus stack where the arc may be extinguished.

11. The method of claim 9, wherein transferring the arc from the winding arc passage into the shaped corridor comprises allowing arc gas and plasma to pass into the shaped corridor through openings in a channel member that forms the shaped corridor.

12. The method of claim 10, wherein transferring the arc from the winding arc passage into the shaped corridor further comprises blocking the arc gas and plasma from passing back into the winding arc passage using one-way valves in the openings in the channel member.

13. The method of claim 10, wherein transferring the arc from the winding arc passage into the shaped corridor further comprises allowing another arc to form in the shaped corridor from the arc gas and plasma passing into the shaped corridor.

14. The method of claim 10, wherein capturing the arc in the winding arc passage comprises interleaving shroud members extending from a shroud of a circuit breaker connected to the bus stack with the busbars and an arc barrier protruding from a back side of the channel member to form the winding arc passage.

15. The method of claim 10, wherein directing the arc in the shaped corridor comprises allowing the arc to move along a phase barrier disposed lengthwise between adjacent busbars substantially parallel to and equidistance from the busbars.

* * * * *